Figure 1:
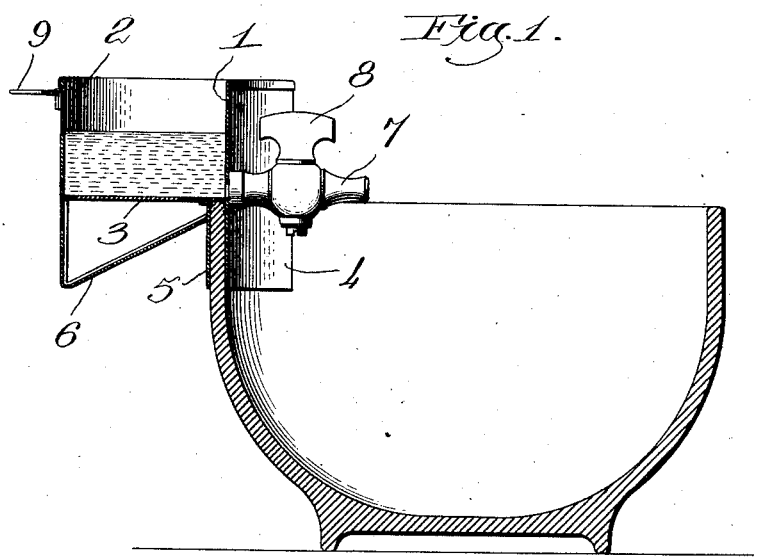

S. E. CREASEY.
MAYONNAISE OIL DROPPER.
APPLICATION FILED APR. 11, 1910.

1,016,481.

Patented Feb. 6, 1912.

Witnesses.
Thomas J. Drummond
Joseph M. Ward.

Inventor.
Samuel E. Creasey,
by Camby Guy
attys.

UNITED STATES PATENT OFFICE.

SAMUEL E. CREASEY, OF SANFORD, MAINE.

MAYONNAISE-OIL DROPPER.

1,016,481. Specification of Letters Patent. Patented Feb. 6, 1912.

Application filed April 11, 1910. Serial No. 554,759.

*To all whom it may concern:*

Be it known that I, SAMUEL E. CREASEY, a citizen of the United States, and resident of Sanford, county of York, and State of Maine, have invented an Improvement in Mayonnaise-Oil Droppers, of which the following description, in connection with the accompanying drawing, is a specification, like characters on the drawing representing like parts.

This invention has for its object to provide a simple, efficient, and inexpensive device for dropping oil during the mixing of mayonnaise salad dressing. Various devices have been arranged for this purpose but they are in general more or less complicated and require special mixing vessels, and consequently, involve considerable expense.

The present invention provides a device which may be attached to any ordinary bowl of suitable size, and which will drop the oil into the bowl at precisely the rate desired, and which is so arranged as to leave the interior of the bowl practically unobstructed, thus enabling the salad dressing to be mixed by the use of an ordinary egg beater.

The nature of the invention will more fully appear from the accompanying description and drawings and will be particularly pointed out in the claims.

The drawings represent a preferred form of the invention in position on an ordinary porcelain or china bowl.

Figure 2:
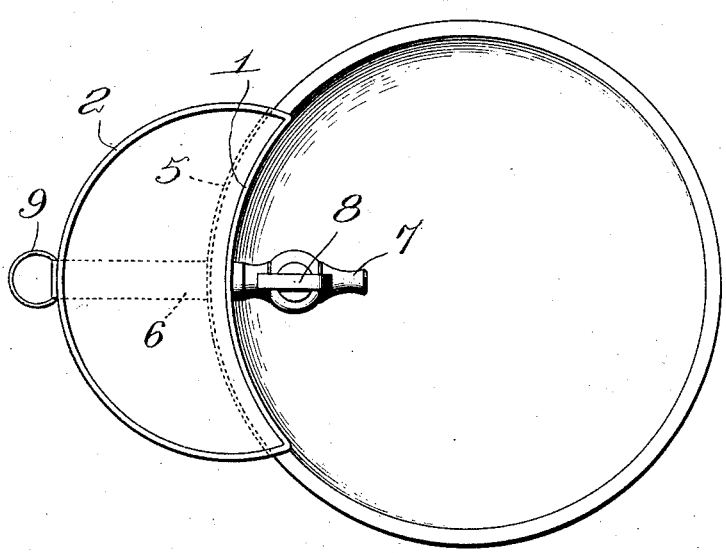

In the drawings, Figure 1 is a view in central, vertical cross-section of an ordinary china or porcelain bowl with the device embodying this invention mounted thereon; Fig. 2 is a plan view of the construction shown in Fig. 1.

The device comprises an oil reservoir which may be made of various shapes, but preferably its inner wall 1 is cylindrical in form and formed on the curve corresponding to that of some ordinary size bowl, while the other wall may take the form of a portion of a cylinder 2 of smaller diameter, but it is obvious that the shape of the reservoir is not important. The bottom 3 of the reservoir is flat.

At its interior edge the reservoir is provided with depending flanges 4 and 5. These flanges are cylindrical and concentric and sufficiently spaced to receive and grip the rim portion of an ordinary bowl. In the form shown, the flange 4 is a continuation downwardly of the interior wall 1 of the bowl and both flanges are shown as continuous, although it is obvious that they need not be continuous throughout their extent. The device is also provided with a leg 6 projecting downwardly from the bottom of the reservoir at a point opposite the depending flanges so that when the reservoir is removed from the bowl and placed upon the table, or other flat surface, it will stand upright and not spill the oil.

A spigot extends from the interior wall of the reservoir, opening into the reservoir at the bottom. This spigot 7 projects over the interior of the bowl and by means of the valve 8 can be regulated to drop the oil at any rate desired. It will thus be seen that the interior of the bowl is left substantially unobstructed, thus enabling an ordinary egg beater to be used for mixing the dressing.

The device can be made in different sizes to fit different sized bowls if desired. It may also be provided with a ring 9 by means of which it may be hung up when not in use.

The device is preferably made of sheet metal, such as ordinary kitchen utensils are made of, and having no complicated or elaborate parts is readily cleansed despite the nature of the oil which it is adapted to receive and feed into the bowl.

Having fully described my invention what I claim as new and desire to secure by Letters Patent is:

1. A mayonnaise oil dropper comprising a reservoir provided with depending flanges adapted to grip the rim of a bowl and support the reservoir thereon, a spigot projecting from said reservoir over the bowl, and a leg depending from said reservoir to form with said flanges supports for maintaining said reservoir level when detached from the bowl and placed upon a table or other flat surface.

2. A mayonnaise oil dropper comprising a reservoir having its front wall cylindrical and extended below the reservoir to form a cylindrical depending flange, a second concentric, depending, cylindrical flange secured to the reservoir and adapted together with the first-mentioned flange to receive and grip the rim of a bowl and support the reservoir thereon, a spigot projecting from said reservoir over the bowl, and a leg depending from said reservoir to form with said flanges supports for maintaining said reservoir level when detached from the bowl and placed upon a table or other flat surface.

In testimony whereof, I have signed my name to this specification, in the presence of two subscribing witnesses.

SAMUEL E. CREASEY.

Witnesses:
VON. E. GERRY,
WALTER K. EMERY.

Copies of this patent may be obtained for five cents each, by addressing the "Commissioner of Patents, Washington, D. C."